March 6, 1945.  C. H. BAKER ET AL  2,370,630
ACETYLENE GENERATOR
Filed Feb. 26, 1941   6 Sheets-Sheet 6

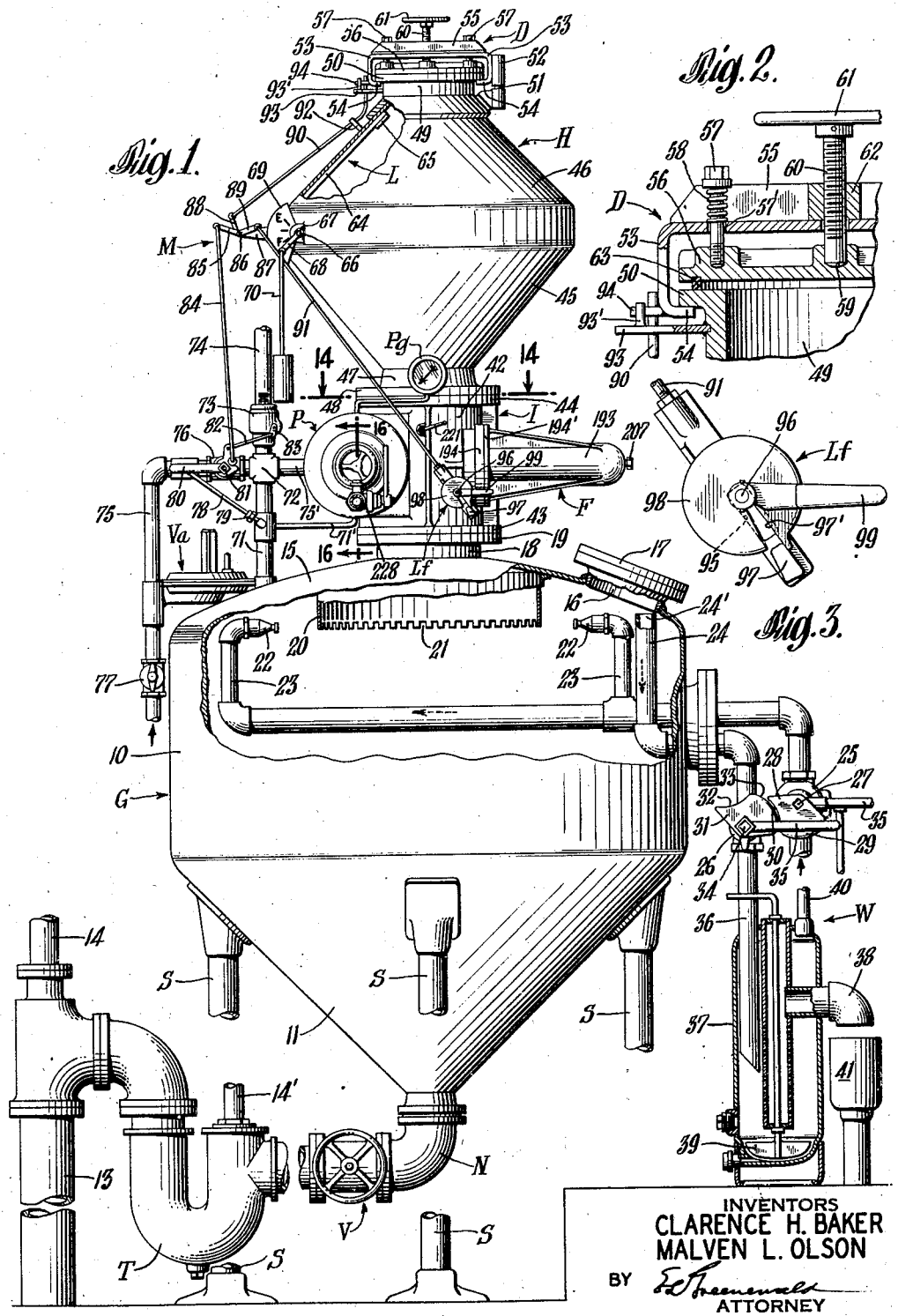

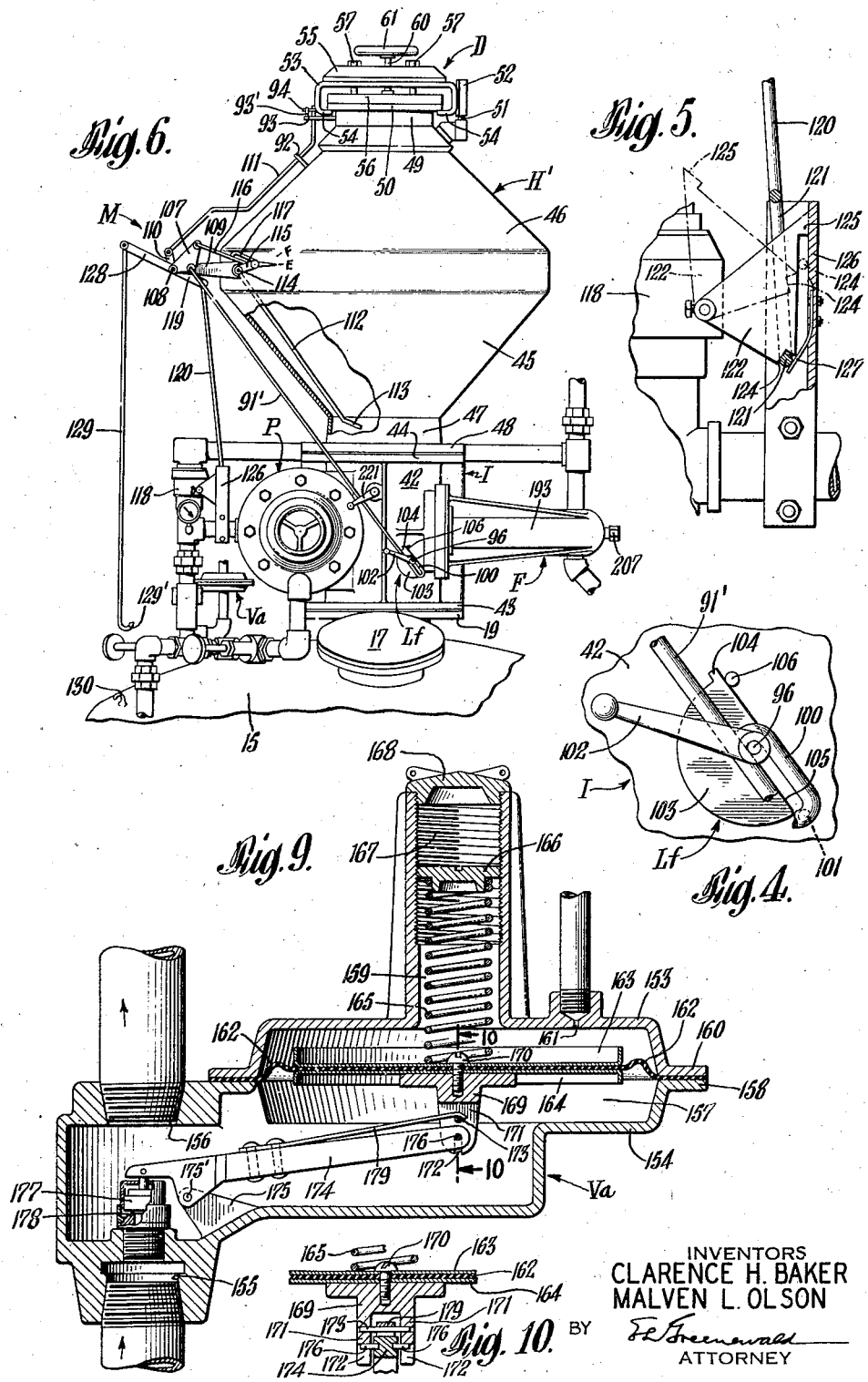

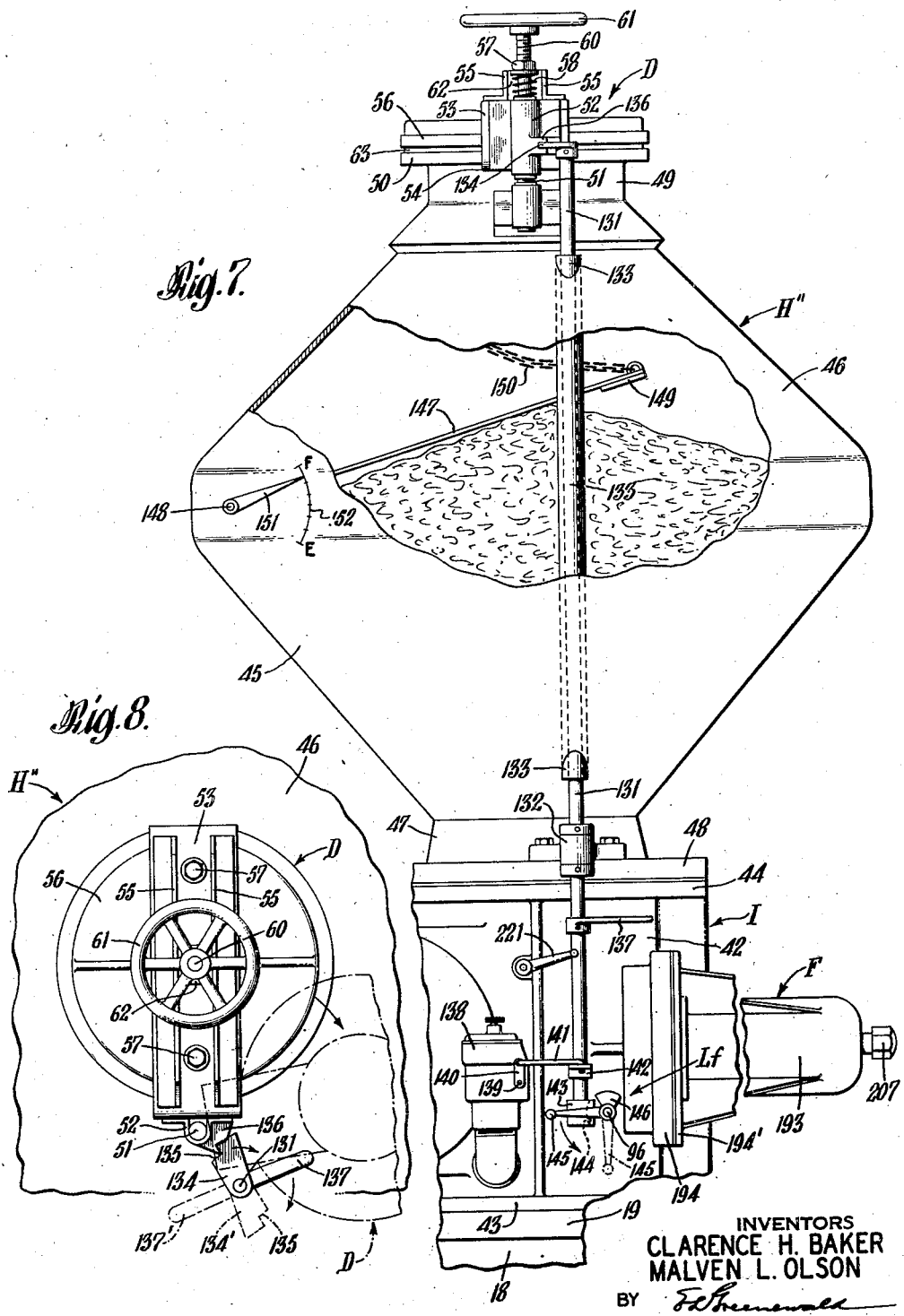

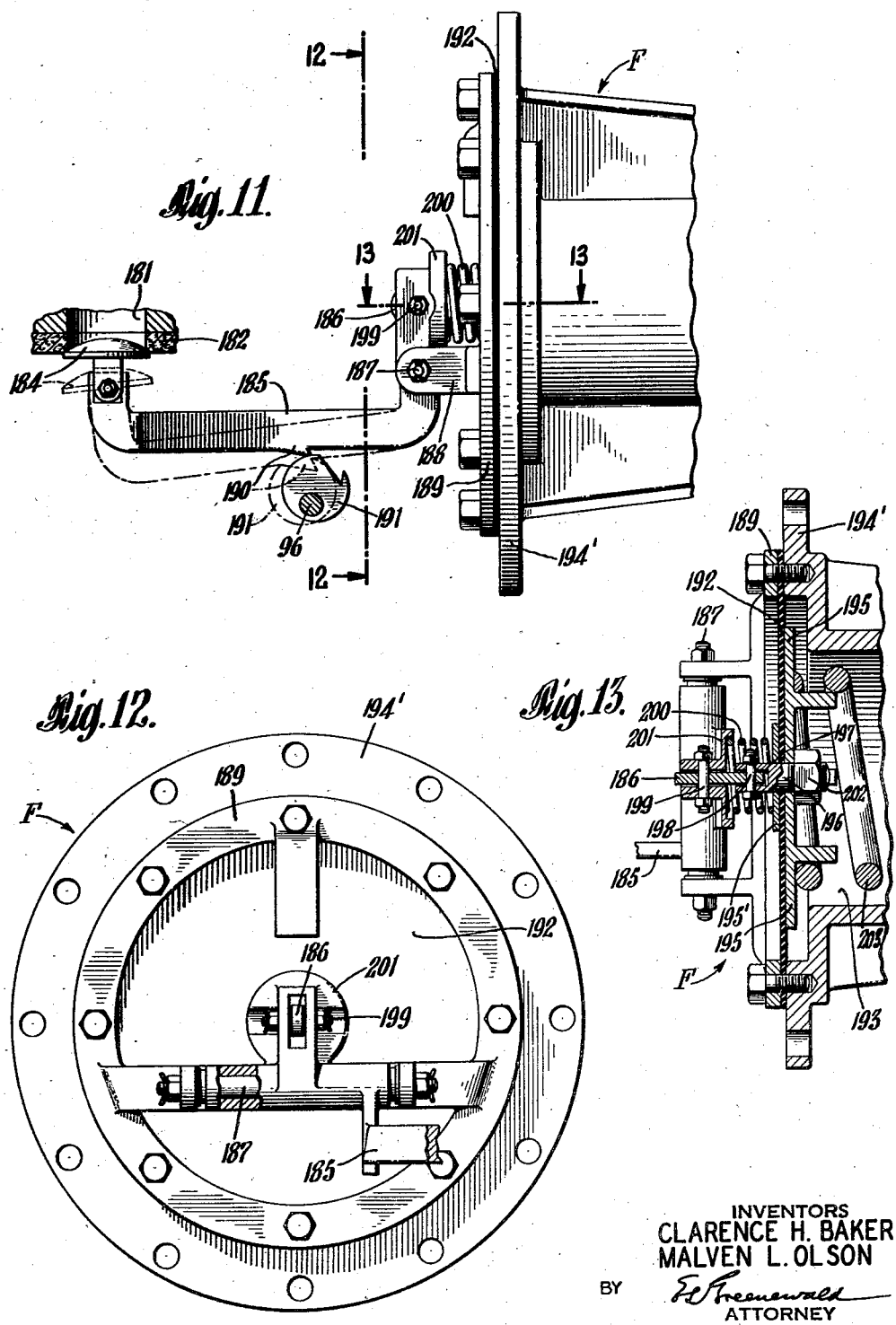

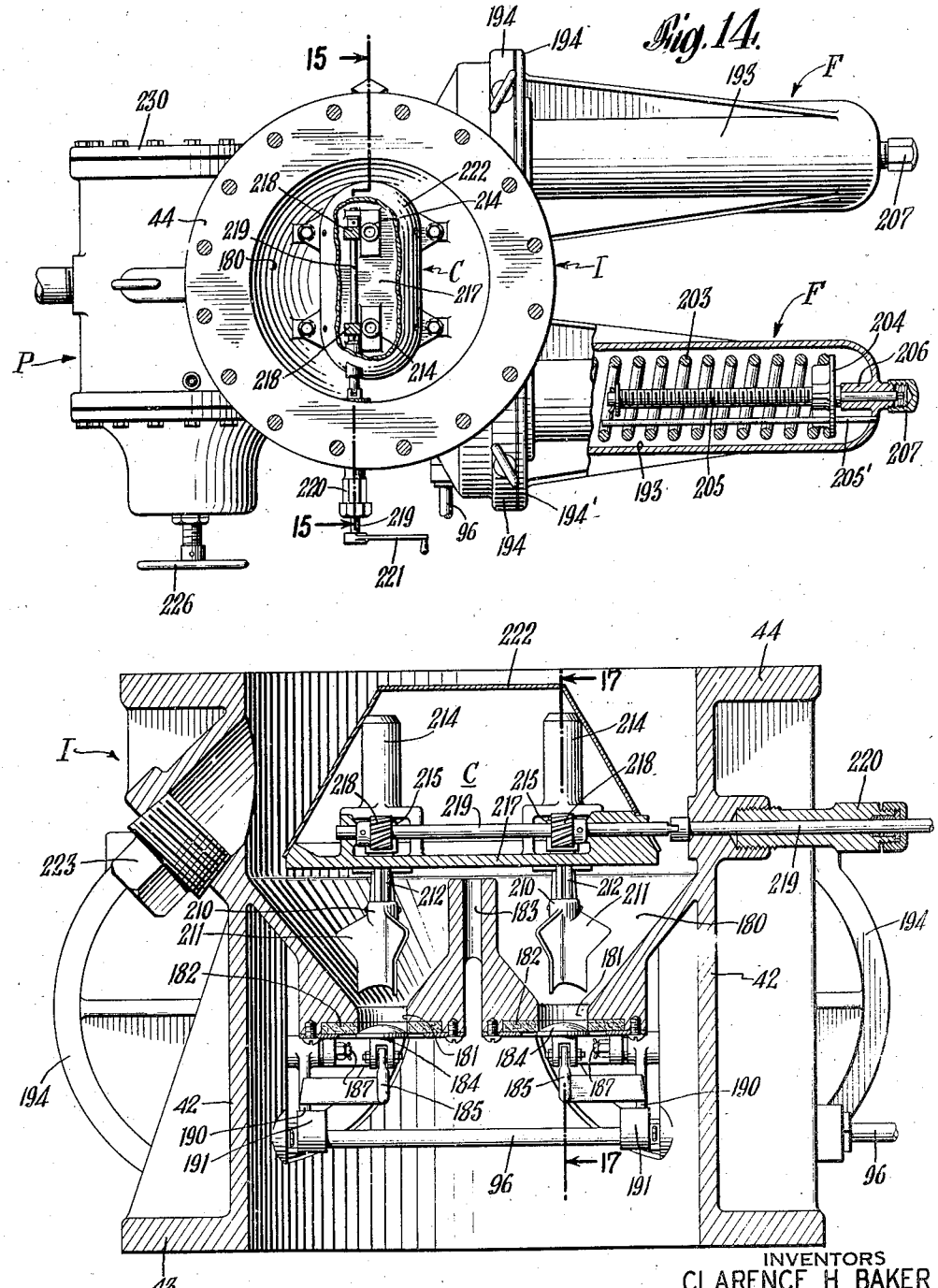

INVENTORS
CLARENCE H. BAKER
MALVEN L. OLSON
BY
ATTORNEY

Patented Mar. 6, 1945

2,370,630

UNITED STATES PATENT OFFICE 2,370,630

ACETYLENE GENERATOR

Clarence H. Baker and Malven L. Olson, Indianapolis, Ind., assignors to Union Carbide and Carbon Corporation, a corporation of New York Application February 26, 1941, Serial No. 380,630

15 Claims. (Cl. 48—38)

This invention relates to acetylene generators, particularly of the carbide-to-water type, and to a method of operating the same.

The increased use of apparatus consuming relatively large amounts of acetylene at a medium pressure of about one atmosphere gauge, particularly apparatus for the thermo-chemical desurfacing of relatively large ferrous metal bodies, such as billets, ingots, blooms and the like, has resulted in a need for a medium pressure acetylene generator which is capable of meeting sudden and prolonged demands without objectionable decreases in pressure. Particularly, when acetylene consuming apparatus is placed in a production line—such as in a rolling mill where steel ingots, billets or the like, are rolled and thermo-chemically desurfaced—it is essential, in order to avoid disruption of production schedules, that the acetylene generator be thoroughly reliable, safe and economical to maintain.

Heretofore, attempts have been made to provide acetylene at medium pressure for heavy duty industrial requirements by the use of a manifold connected with a battery of cylinders containing acetylene at a relatively high pressure. Due to the relatively small amount of gas contained in each cylinder, and the relatively large number of cylinders which must be employed, this manner of supplying acetylene at medium pressure has not been commercially satisfactory. It has also been proposed to provide acetylene at medium pressure from a bank of low pressure acetylene generators operated in conjunction with auxiliary equipment including a gasometer and a pumping unit. However, due to the numerous pieces of equipment required and the difficulty of servicing such equipment, this type of acetylene supply is less economical, less reliable, and more difficult to maintain than is desirable.

It has also been proposed to utilize, in an acetylene distributing system for supplying acetylene at a gauge pressure of about one atmosphere, a plurality of medium pressure acetylene generators connected in parallel; and a method of operating such a distributing system is disclosed and claimed in Patent No. 2,309,701, R. J. Kehl, issued February 2, 1943.

Acetylene generators of the carbide-to-water type are ordinarily provided with control or interference mechanism to insure that a proper sequence of steps will be followed in recharging such generators. To clean or repair such known control devices usually requires their removal from the generator. Also, depending upon the structural arrangement of the generator or its location within a building, many of these devices are inaccessible and often require disassembly of the entire generator in order to remove or repair the control or interference mechanism.

Accordingly, among the objects of this invention is to provide an improved acetylene generator of the carbide-to-water type, having a relatively large generating capacity, but of relatively simple design, and adapted to produce acetylene at medium pressures of about one atmosphere gauge to meet heavy-duty commercial requirements, in a manner which overcomes the above and other difficulties encountered with prior apparatus for generating and supplying acetylene at such medium pressures.

Other objects of the invention include the provision of a generator comprising, as a unitary assembly, a carbide hopper, an intermediate control section or housing, and a reaction chamber; to provide in such a generator an improved control or interference mechanism, which insures that a proper sequence of steps will be followed in recharging operations; to provide such control mechanism in freely accessible positions; to provide, in the intermediate section or housing of such a generator, means for feeding carbide to the reaction chamber, such feeding being accomplished preferably by pressure responsive mechanism adapted to be locked in closed position by the interference mechanism; to provide, in the intermediate section or housing of such a generator, means for removing caked carbide from the feed opening leading to the generating chamber, such means being operable from the exterior of the generator; to provide improved means for regulating the pressure of acetylene leaving the generator; to provide in the acetylene outlet conduit, means operatively connected to the interference mechanism, for venting excess acetylene pressure within the generator; to provide a method for spraying water into the generating chamber of such generator only when the latter is being recharged; to provide a water supply system having an associated interference mechanism which insures that a proper sequence of steps will be followed in refilling the generating chamber to the proper level with water; to provide the carbide hopper of such a generator with a positive and smoothly operating carbide-level indicator; and to provide an improved acetylene pressure reducing valve adapted to feed low pressure acetylene to the generator when the latter is being recharged.

The above and other objects and novel features of the invention will become apparent from the following description and accompanying drawings, in which:

Fig. 1 is a front elevation of an acetylene generator embodying the principles of this invention, certain parts thereof being broken away to show the interior construction;

Fig. 2 is an enlarged vertical view partially in section of the latch means for locking the door of the carbide hopper of the generator of Fig. 1;

Fig. 3 is an enlarged view of a portion of an interference mechanism, shown generally in Fig. 1, which is adapted to lock the carbide feeding means in a closed position;

Fig. 4 is an enlarged view, partly broken away, of a modification of the portion of the interference mechanism shown in Fig. 3;

Fig. 5 is a vertical sectional view of a modification of a device adapted to open and close the acetylene pressure relief valve shown in Fig. 1;

Fig. 6 is a front elevation, illustrating a modification of the interference mechanism and carbide hopper level indicator;

Fig. 7 is a front elevation, illustrating a further modification of the interference mechanism and carbide hopper level indicator;

Fig. 8 is a partial plan view of the carbide hopper door and latch mechanism shown in Fig. 7;

Fig. 9 is a vertical sectional view of the acetylene pressure reducing valve, shown generally in Figs. 1 and 6;

Fig. 10 is a vertical sectional view taken along the line 10—10 of Fig. 9;

Fig. 11 is a partial side elevational view of the carbide feed regulator and locking mechanism therefor, shown generally in Figs. 1 and 3;

Fig. 12 is an end view of the carbide feed regulator taken from the left along the line 12—12 of Figs. 11;

Fig. 13 is a sectional view through the diaphragm mechanism of the carbide feed regulator, taken along the line 13—13 of Fig. 11;

Fig. 14 is a horizontal view, partly broken away, of the intermediate control housing, taken along the line 14—14 of Fig. 1;

Fig. 15 is a vertical sectional view through the intermediate control housing, taken along the line 15—15 of Fig. 14;

Figure 16:
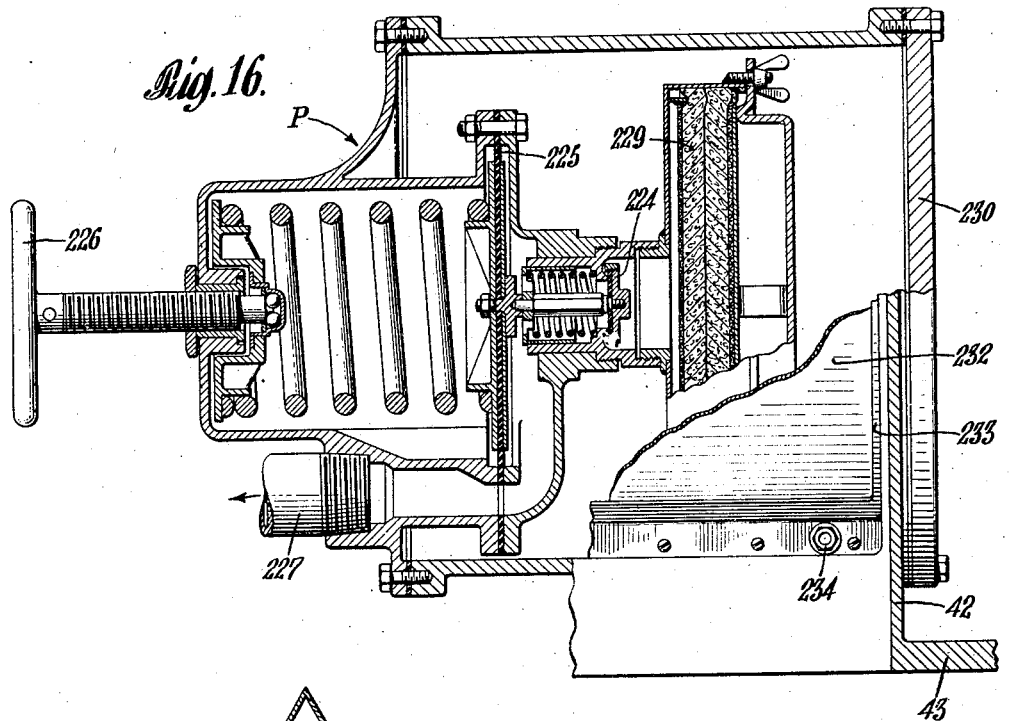
Fig. 16 is a vertical sectional view through the acetylene filter and pressure regulator, taken along the line 16—16 of Fig. 1.

Referring to the drawings, the principles of the invention are shown as applied to an acetylene generator comprising a generating chamber G, provided with a water-supply and overflow unit W and a sludge drain-off valve V. A carbide hopper H is located in spaced relation above the generating chamber G and is provided with a charging door D and a carbide level indicator L. An intermediate section or housing I, which may be removed as a unitary assembly from the generator, is interposed between and in gas-tight relation to the hopper H and the generating chamber G, and houses the generator control mechanism. Such mechanism includes an acetylene pressure regulator P, single or dual pressure-responsive carbide feed valve devices F, a carbide feed-valve locking device Lf, and the carbide cutter assembly C of Figs. 14, 15 and 17. If desired, a pressure gauge Pg may be provided to indicate the pressure of acetylene within the generating chamber G. The generator is also provided with an interference mechanism M, comprising a system of interconnected rods for insuring that, in preparing the generator for recharging a definite sequence of steps will be followed. An acetylene pressure reducing valve Va, of novel construction is disposed in the piping adjacent the intermediate housing I.

With reference to Fig. 1, the generating chamber G comprises a cylindrical upper portion 10 and a lower conical portion 11 having a drain N in the lowermost portion thereof. A shut-off valve V is disposed in drain N and is adapted to discharge sludge, resulting from the reaction of carbide with water, from generator G through trap T into waste pipe 13 which is suitably vented at 14. A water connection 14' is provided on the inlet side of trap T for the purpose of flushing and cleaning the latter. Suitably disposed exterior supporting members S secured to the conical portion 11 are provided to support the generator. The upper part of the generating chamber G is provided with a dome 15 and a clean-out opening 16, which latter is provided with a cover 17. The dome 15 terminates in a centrally disposed and upwardly extending collar 18 having an outwardly extending flange 19, said collar forming a communicating passage between the lower portion of the intermediate section or housing I and the interior of generating chamber G. A tubular baffle plate 20 having a lower serrated edge 21 is centrally disposed within the generating chamber G directly below the upwardly extending collar 18. This baffle plate 20 is secured in gas-tight relation to the dome 15 and extends downwardly to a point below the surface of the water in the generating chamber. The acetylene which rises to the surface of the water within the area bounded by the baffle plate 20 collects within the latter and causes the water level therein to be depressed to a point adjacent the serrated edge 21. The acetylene thus collected passes downwardly and under the serrated edge, and by so doing is scrubbed of entrained carbide or lime dust.

One or more spray nozzles 22, each secured to a suitable water inlet conduit 23, is provided to spray the incoming water into the generating chamber G only while the generator is being recharged. The spray nozzles are preferably positioned tangentially with respect to the tubular baffle plate 20 to impart a rotary action to the acetylene and water spray within the gas space of the generating chamber. The water which collects at the bottom of the chamber is substantially saturated with acetylene. Due to such absorption, the pressure of acetylene within the chamber, when the latter is filled to the proper level with water, is not materially greater than the normal operating pressure of the generator. Hence, little if any acetylene need be vented to the atmosphere during a recharging operation.

A water overflow conduit 24, having an inlet orifice 24' disposed in a horizontal plane slightly above the serrated edge 21 of the baffle plate 20, is provided to avoid flooding the generator with water during a recharging operation. From the interior of the generating chamber G, water inlet conduit 23 and water overflow conduit 24 extend to the exterior of the generator, and both conduits are connected to a pair of closely spaced stop, or plug-type, water inlet and water overflow valves 25 and 26, respectively. The valve stem 27 of the water inlet valve 25 is provided with an arcuate cam or interference plate 28, which has adjacent convex and concave portions 29 and 30 respectively on a portion of its periphery. A similar cam or interference plate 31, having similarly adjacent but oppositely positioned peripheral concave and convex surface portions 32 and 33 respectively, of the same radius of curvature as the portions 29 and 30 on the water inlet valve 25, is provided on the valve stem 34 of valve 26. The concave surface of one cam fits within the convex surface of the other cam as with the valves in closed position as shown in Fig. 1. Both cams are disposed on their respective valve stems in such a manner that the valves must be properly opened and closed. It will be evident that valve 25 cannot be opened in the position shown, since the concave portion 30 will strike the convex portion 33 of plate 31. Thus, water overflow valve 26 must be opened before water inlet valve 25, i. e., by moving lever 35 from a horizontal position downwardly through an angle of 90° to position concave portion 32 of cam 31 adjacent the concave portion 30 of cam 28 of the water inlet valve 25. Lever 35, or a similar lever, is then used to open water inlet valve 25 by turning valve stem 27 clockwise through an angle of 90°, to place convex portion 29 of cam 28 in interfitting relation with the concave portion 32 of cam 31. To close the water inlet and overflow valves 25 and 26 respectively, a reverse procedure must be used, i. e., water inlet valve 25 must be closed first and then water overflow valve 26 may be closed. Thus, the cooperating cams 28 and 31 insure that the water inlet and overflow valves 25 and 26 respectively, will be opened and closed in proper sequence.

A relatively short conduit 36 leads from the exit side of valve 26 to an overflow trap 37, which latter is provided with an outlet connection 38, a sludge agitator 39 and an air vent 40. A waste pipe 41 is suitably disposed beneath the outlet connection 38, so that the operator may observe if water is being discharged through the overflow pipe 24 and conduit 36, indicating that the generating chamber has been filled to the desired level.

Figure 17:
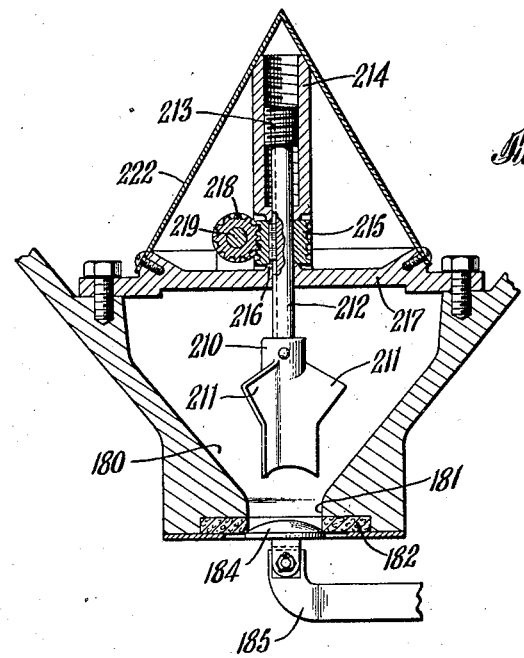
Fig. 17 is a vertical sectional view illustrating the carbide cutting mechanism, and is taken from the right along the line 17—17 of Fig. 15.

The intermediate housing I, centrally disposed on top of the generating chamber G, comprises a vertically disposed cylindrical member 42 having, in its lower end, an outwardly extending flange 43 which corresponds in diameter to the flange 19 of the collar 18 on the generating chamber G, and both flanges 19 and 43 may be bolted together or otherwise suitably secured to form a gas-tight joint. An outwardly extending flange 44 is provided on the upper end of the intermediate housing I and forms a support for the carbide hopper H. Suitably disposed between the upper and lower flanges 43 and 44 are one or more pressure-responsive carbide feed valve operating devices F, a carbide feed-valve locking device Lf and a carbide cutter assembly C (Figs. 14, 15 and 17).

The carbide hopper H comprises a lower funnel-shaped portion 45 and an upper inverted funnel-shaped portion 46, the former terminating in a short cylindrical portion 47 which is provided with an outwardly extending flange 48 on its lower edge. Flange 48 engages the upper flange 44 on the intermediate housing and both of the flanges may be bolted or otherwise suitably secured to form a gas-tight joint. The inverted funnel-shaped portion 46 of the hopper H terminates in a short reinforcing collar 49 having an outwardly extending flange 50. Collar 49 supports a vertical pin 51 adapted to form, with sleeve 52, a hinge for a charging door D which is provided at the top of the hopper H.

Sleeve 52 is secured to one leg of an inverted U-shaped bar 53 which is provided with inwardly extending lips 54 for engaging the underside of the flange 50 when the door D is in closed position, as in Figs. 1 and 2. A pair of reinforcing angle irons 55 extend entirely across the top of the inverted U-shaped bar 53. A circular cover plate 56, of substantially the same diameter as the flange 50 on the upper part of the hopper H, is suspended by a pair of machine screws 57 passing through suitable clearance holes 57' in the inverted U-shaped bar 53. The head of each machine screw rests on the upper end of a compression spring 58 which surrounds the screw, and the lower end of each compression spring 58 engages the upper surface of bar 53 around the clearance hole 57'. The lower end of a vertical shaft 60, which is threaded for a greater part of its length engages a recess 59 centrally located in the upper surface of cover plate 56. The upper end of shaft 60 is provided with a handwheel 61, and a threaded block 62 engages the threads on shaft 60. Block 62 is rigidly secured between the angle irons 55, so that by turning handwheel 61, threaded shaft 60 will compress springs 58 and force cover plate 56 downwardly against the upper surface of flange 50, thereby forming a gas-tight seal across the top of hopper H. A gasket 63 may be placed, if desired, between cover plate 56 and the upper part of flange 50. By rotating handwheel 61 in the reverse direction, the springs 58 are permitted to expand and thereby lift the cover plate 56 off the top part of flange 50. When in its raised position, the door D may be pivoted in a horizontal plane about pin 51 to permit access to the hopper H for charging with carbide.

The carbide level indicator L comprises a carbide surface contacting arm 64 having a flat paddle 65 secured to one end. The other end of arm 64 is secured to a horizontal rod or shaft 66, disposed at one side of and vertically mid-way of the hopper H. Shaft 66 extends through a suitable stuffing box 67 disposed in the wall of the hopper H. A relatively short crank arm 68 is secured to the external end of shaft 66 to move in unison with arm 64 and indicates, on a suitable scale 69, the level of carbide within hopper H. A weighted rod 70 is pivotally secured to the outer end of the crank arm 68 and has sufficient weight to maintain contacting arm 64 in raised position and thus to avoid damage thereto during a recharging operation. When the operator desires to determine the level of carbide within hopper H, he raises rod 70 until the paddle 65 comes in contact with the surface of the carbide, and the level of the carbide within the hopper is indicated by crank 68 on scale 69.

The lower end of acetylene outlet conduit 71 extends through dome 15 at a point intermediate the baffle 20 and the wall 10 of the generating chamber. The upper end of conduit 71 connects with the lower side of a cross 72, the right hand side of the latter being connected by conduit 75' with the inlet of a pressure regulator P supported by the intermediate housing I. The upper side of cross 72 is connected to a conventional mechanically openable or trip-type pressure relief valve 73, which is adapted to vent acetylene through a conduit 74 to the exterior of a building housing the generator. The left hand side of the cross 72 is connected with a conduit 75, which supplies acetylene from an outside medium pressure source to the generator G, while the latter is being recharged. A stop or plug-type acetylene return valve 76, a pressure reducing valve Va, and a shut-off valve 77 are disposed in conduit 75. A cross-over pipe 78, of relatively smaller diameter than conduit 75, extends from the inlet side of valve 76 to a point on conduit 71 below the cross 72. Within a fitting 79 a small orifice (not shown) is provided to restrict the flow of acetylene to about one cubic foot per minute from conduit 75 to the carbide hopper H, through conduits 71 and 75', during a recharging operation and while valve 76 is closed. A suitable drain pipe 71' extends from the lower portion of the acetylene pressure regulator P to conduit 71, and removes any water collected in the pressure regulator.

The operating lever 83 of acetylene pressure relief valve 73 is operatively connected, by rod 82, to a handle 80 which turns the stem 81 of the acetylene return valve 76. Rod 82 and lever 83 are so constructed and arranged that when stem 81 of the acetylene return valve 76 is rotated by handle 80 through an angle of 45°, from the normally open position shown in Fig. 1, the pressure relief valve will be fully opened as lever 83 is swung to the right. Upon continued rotation of the handle 80 through another angle of 45°, the relief valve 73 is again closed as lever 83 is moved back to the left.

An interference mechanism M is provided for interconnecting acetylene return valve 76, the carbide feed-valve locking device Lf on the intermediate housing I, and the carbide hopper charging door D. Such mechanism includes a rod 84, the lower end of which is pivotally secured to the acetylene return valve handle 80 at a point adjacent the valve stem 81, while the upper end thereof is pivotally connected to the end of an arm 85 which latter is secured to a rotatable horizontal shaft 86. Shaft 86 is supported by a suitable bracket 87, secured to the side of hopper H. Horizontal shaft 86 is provided with two relatively short lever arms 88 and 89, which rotate with shaft 86 as bell crank levers. The outer end of lever 88 is pivotally connected to an upwardly extending carbide hopper interference rod 90, and the outer end of lever 89 is pivotally connected to a downwardly extending rod 91 for locking the carbide feed-valve device Lf. The upper end of rod 90 passes slidably through a guide 92 disposed on the hopper H adjacent the collar 49 and terminates at a point slightly above the lip 54 of inverted U-shaped bar 53. As in Fig. 2, a stop having horizontal and vertical portions 93 and 93' respectively is suitably secured to the collar 49 and the latter engages an outwardly extending pin 94 disposed on the lip 54 of the bar 53. When door D is in normally closed position, one side of pin 94 is adjacent or in contact with the vertical portion 93' of the stop while the upper end of interference rod 90 is disposed on the other side of, and extends slightly above, pin 94, thus effectively locking door D. When door D is to be opened, the upward movement of handle 80 causes the upper end of rod 90 to move downwardly and outwardly away from pin 94, thus permitting the door D to be swung in a horizontal plane about pin 51 as an axis.

As best seen in Fig. 3, the lower end of rod 91 is provided with a slot 95 through which passes a shaft 96 for locking or permitting the operation of the carbide feed valves within the intermediate housing I. A raised lug 97 is provided at the lower end of rod 91 and engages a cooperating slot 97' in a circular disc 98 which is rigidly secured to the shaft 96. A handle 99 is rigidly secured to the disc 98 for rotating shaft 96. During normal operation of the generator, the lug 97 does not engage the slot 97' of the circular disc 98, thus permitting the operator to rotate handle 99 to open or close the carbide feeding valve, hereinafter described. To prevent the introduction of carbide into the generating chamber, the handle 99 is rotated so as to close the carbide feeding means, and when in such closed position, the slot 97' is in alignment with the lug 97. Upon rotation of handle 80 of the acetylene return valve 76 to its closed position, the raised lug 97 at the bottom of rod 91 slides into slot 97' and effectively locks the carbide feeding means. By the provision of the above described interference mechanism, the carbide hopper cannot be recharged while carbide is being fed to the generating chamber.

A modification of the carbide feed valve locking device Lf is shown in Fig. 4, wherein the lower part of the interference rod 91' is provided with a loop 100 through which passes shaft 96. At the lower end of the loop 100, a pin 101 extends in the direction of the intermediate housing I. A handle 102 is secured to the outer end of shaft 96 outside the loop 100 and a semi-circular plate 103 is secured to the shaft 96 at a point immediately behind the loop 100. Plate 103 is provided with a lip 104 adapted to engage the pin 101 when handle 102 is moved to its open position. Edge portion 105 of plate 103 is recessed to permit the pin 101 on the rod 91' to slide toward shaft 96 when handle 102 is moved in a counter-clockwise direction to its closed position. A stop pin 106 may be provided to limit the rotation of disc 103 in its clockwise movement.

A modification of the interference mechanism, carbide level indicator, and the device for momentarily opening the acetylene relief valve, is shown in Figs. 5 and 6. With particular reference to Fig. 6, the upper end of interference rod 91' is pivotally secured to a link plate 107 which is rigidly secured to a horizontal and rotatable shaft 108. Shaft 108 is supported by a pair of arms 109 disposed on the side of and vertically mid-way of the carbide hopper H'. One end of a relatively short lever arm 110 is secured to shaft 108, while the other end thereof is pivotally connected to an interference rod 111 for locking the carbide feed door D in closed position in the same manner as described in connection with Fig. 1. A carbide level indicator arm 112, disposed at one side and within the carbide hopper H', is provided with a paddle 113 at its outer end, and the other end of arm 112 is secured to a horizontally rotatable shaft 114 disposed within the generator adjacent the external supporting arms 109. The shaft 114 extends through a stuffing box (not shown), disposed in the wall of hopper H', and a relatively short lever arm 115 is secured to the outer end of the shaft 114. A rod 116 is pivotally connected at one end to link plate 107 and is provided with a slotted link 117 at its other end. The slotted link 117 engages a stud (not shown) on the underside of lever 115. With the carbide level indicator arm 112 in the position shown in Fig. 6, the rotation of link plate 107 in a counter-clockwise direction will raise the arm 112. During a hopper recharging operation the arm 112 is held up out of the way of the descending carbide by the counter-clockwise movement of link plate 107. Slotted link 117 permits the indicator arm 112 to contact and to follow the downward movement of the carbide after the link plate 107 is moved clockwise to its original position.

As in Fig. 5, the acetylene pressure relief valve 118 is operated from the shaft 108 through a lever arm 119. One end of arm 119 is secured to rotatable shaft 108, while the other end of the lever arm is pivotally secured to an interference rod 120, the lower end of which is provided with a loop or link 121 which cooperates with a rotatable triangular plate 122. The lower apex of the triangular plate 122 is provided with a notch 124, while the upper apex of such plate is provided with a raised stop 125 which rests against the inside of a channel 126 during normal operation of the generator. A leaf spring 127 is secured to the channel 126 to force the lower end of loop 121 back into notch 124 when said loop moves downwardly after the valve 118 has been opened. Spring 127 also holds the end of the loop 121 in the notch 124 when the plate 122 is in normally closed position. Valve 118 is momentarily opened by moving rod 120 upwardly from the position shown in Fig. 5, thus causing the triangular plate 122 to rotate in a counterclockwise direction, by the pull exerted by the lower end of loop 121 in notch 124. At a point intermediate the travel of rod 120, the loop 121 slips out of the notch, as at 124' shown in dotted lines in Fig. 5. This permits plate 122 immediately to resume its original position, while the loop 121 continues to move upwardly to the end of its travel within a slot formed between plate 122 and channel 126. Upon lowering the interference rod 120, the lower end of loop 121 is automatically replaced in notch 124 by the action of leaf spring 127.

For operating the interference mechanism, one end of a lever arm 128 is rigidly secured to the shaft 108, as in Fig. 6. The other end of lever arm 128 is pivotally connected to an operating rod 129 having a hook 129' at its lower end which is adapted to engage a second hook 130, secured to the dome 15 of the generating chamber. When operating rod 129 is moved downwardly, the hook 129' may be placed in engagement with hook 130. Such movement causes the bell cranks 110, 119, and 128 as well as the link plate 107 to operate the interference rods 111, 116, 91' and 120 simultaneously. Thus, the carbide hopper door D is opened; the carbide level indicator arm 112 is raised; the shaft 96, operating the carbide feed valve, is locked; and the pressure relief valve 118 is momentarily opened. When rod 129 is disengaged from hook 130 and moved upwardly to the position shown in Fig. 6, rod 111 moves upwardly to lock door D in closed position; rod 116 is moved to the right to permit the carbide level indicator arm 112 to descend and to contact the surface of carbide within the hopper H'; interference rod 91' is lowered, thus permitting the shaft 96 of the carbide feed valve lock to be rotated; and rod 120 is lowered to cause loop 121 to re-engage notch 124 on triangular plate 122.

A further modification of the interference mechanism is shown in Figs. 7 and 8. A vertical interference rod or shaft 131, rotatable about its longitudinal axis, extends from a point adjacent door D, downwardly through the hopper H" within a sleeve 133, to a point alongside the intermediate housing I. Shaft 131 is suitably supported by a conventional journal and collar bearing arrangement 132, adjacent the lower flange 48 of the carbide hopper H". A rectangular latch 134, rigidly secured at one end to the top of shaft 131 and provided at the other end with a notch 135, cooperates with a notched projection 136 on the door D. When in engagement with each other, the latch 134 and projection 136 prevent door D from swinging open. When latch 134 is rotated in a clockwise direction, away from projection 136, to assume the dotted position indicated at 134' in Fig. 8, door D may be swung open. A handle 137, for rotating the shaft 131, is secured to the shaft 131 adjacent housing I.

In the modification of the interference mechanism shown in Figs. 7 and 8, an acetylene pressure relief valve 138 is supported on the intermediate housing I, and is adapted to vent acetylene from the intermediate housing just prior to recharging the carbide hopper H". Shaft 139 of the conventional trip or opening mechanism of the pressure relief valve 138 is secured to one end of a link 140. The other end of link 140 is pivotally connected with one end of a relatively short connecting rod 141, while the other end of the rod 141 is pivotally connected with a collar 142 secured to the interference shaft 131. When handle 137 is rotated from the full position (at the right of rod 131) to the dotted position 137' of Fig. 8 (at the left thereof), the shaft 139 of the trip mechanism of the pressure relief valve is rotated by means of collar 142, connecting rod 141, and link 140. Thus, the relief valve 138 momentarily vents acetylene to the atmosphere.

For locking the carbide feeding means, a slotted sleeve 143 is secured to the lower end of the shaft 131 and is so positioned that when the handle 137 is on the right side of shaft 131, as shown in Fig. 7, the slot 144 in the sleeve 143 faces the shaft 96. A handle 145, having a latch 146 extending at 90° therefrom, is rigidly secured to the end of the shaft 96. The latch will engage or fit within the slot 144 of sleeve 143 only when the interference rod operating handle 137 is thrown to the right. If handle 137 is thrown to the left, the slot 144 in the sleeve 143 will be out of alignment with latch 146, and shaft 96 of the carbide feed valve lock cannot be rotated to unlock the carbide feeding mechanism since latch 146 will strike sleeve 143. During normal operation of the generator, handle 137 of the interference rod 131 is disposed on the right of the latter, thus locking the carbide charging door D in closed position and permitting the rotation of handle 145 of the carbide feed valve lock Lf. When the generator is to be recharged, the carbide feed valve is locked in closed position by raising handle 145 to the horizontal position shown in Fig. 7, and thereafter the handle 137 of the interference shaft 131 is rotated to the left. Such rotation of shaft 131 releases the latch 134 from the door D of the carbide hopper, momentarily vents the pressure relief valve 138, and prevents rotation of the shaft 96 of the carbide feed valve lock.

Hopper H", as in Fig. 7, is provided with a carbide level indicator which comprises a carbide surface contacting arm 147 secured at one end to a horizontal rotatable shaft 148 and provided at the opposite end with a paddle 149. One end of a chain 150 is secured to the paddle 149 and the other end of the chain is suitably secured to the inside of collar 49. Chain 150 permits the operator to raise the carbide surface contacting arm 147 before the hopper H" is charged with carbide. The rotatable shaft 148 extends through a suitable stuffing box (not shown) in the wall of the hopper, and the outer end of shaft 148 is provided with a pointer 151 for showing, on a suitable scale 152, the level of the carbide within hopper H".

With reference to Figs. 1 and 9, the acetylene pressure reducing valve Va, disposed in the piping adjacent the dome 15 of the generating chamber G, comprises an upper housing 153 and a lower housing 154 secured to each other in any suitable manner. As in Fig. 9, the lower housing 154 is provided with gas inlet and outlet passages 155 and 156, respectively and a relatively large circular chamber 157 having an outwardly extending flange 158. The upper housing 153 has a centrally and vertically disposed spring chamber 159, a flanged edge 160 of substantially the same diameter as flange 158, and a venting orifice 161. A flexible diaphragm 162 is held gas-tightly between the two flanges 158 and 160, and is provided with upper and lower diaphragm contacting plates 163 and 164 respectively, the plates being centrally disposed with respect to the spring chamber 159. The lower end of a compression spring 165, disposed within the spring chamber 159, presses against the central portion of the upper diaphragm contacting plate 163, and the pressure of spring 165 is maintained or adjusted by a peripherally threaded plug 166 engaging threads 167 within the upper part of the spring chamber 159. A peripherally threaded cap 168 closes the end of spring chamber 159, and permits access to spring adjusting plug 166.

As in Figs. 9 and 10, on the underside of the lower diaphragm contacting plate 164, and axially aligned with respect to spring 165, a fork 169 is rigidly secured by a screw 170 to the diaphragm 162 and to the diaphragm contacting plates 163 and 164. The lower end of each leg 171 of the fork 169 is provided with an upwardly extending slot 172, and a pin 173 extends between the legs 171 at a point slightly above the end of the slots 172. A lever arm or bar 174, pivoted on a pin 175' which is supported by a lug 175 adjacent the acetylene inlet 155, extends from a point above this inlet to a point within the legs of fork 169. The end of bar 174, within the legs of fork 169, is provided with a pair of outwardly extending pins 176, each pin being adapted to fit within one of the slots 172. Adjacent the inlet passage 155, a valve 177 is pivotally secured to the end of bar 174. When the pressure within the lower chamber 154 falls below a preselected value, spring 165 pushes the diaphragm contacting plates 163 and 164, the diaphragm 162, fork 169, and the end of the bar 174 with which the latter is engaged, in a downward direction. This downward movement causes bar 174 to pivot on its support 175 and to lift valve 177 upwardly, thereby permitting acetylene to flow into the lower chamber 154.

One end of a cantilever spring 179 is rigidly secured to the top of bar 174 at a point thereon nearly opposite the supporting lug 175, while the other end of said spring engages the top of the pin 173. If the pressure within the lower housing 154 of the pressure reducing valve increases, the diaphragm 162, diaphragm contacting plates 163 and 164, and fork 169 move upwardly against the compression spring 165. Spring 179 pulls the end of bar 174 upwardly, thus causing valve 177 to descend and to decrease the flow of acetylene. Due to the relatively large area of the diaphragm, a small pressure differential on the sides thereof will cause considerable force to be applied to the lever arm 174. However, due to the yielding manner with which valve 177 is operatively connected to diaphragm 162, through spring 179, the possibility of a large force deforming or injuring the valve 177 or lever arm 174 is eliminated. That is, the only compressive force applied to valve 177 and its seat 178 is due to the tension provided by spring 179, hence during operation such compressive force will be fairly uniform and the reducing pressure valve Va will have a positive and reliable action over a long period of time. Also, if the pressure in the lower chamber 154 should suddenly increase no injury will result to the bar 174 or valve 177, because after the latter is properly seated, bar 174 remains stationary while spring 179 and pins 173 and 176 allow the diaphragm 162, diaphragm contacting plates 163 and 164, and fork 169 to continue upwardly until compressive equilibrium is established with spring 165.

During normal operation of the generator, the acetylene pressure reducing valve Va is inactive and no acetylene flows therethrough. When sludge is being drained from the bottom of the generator, the pressure reducing valve Va, which receives acetylene at a gauge pressure of about 12 to 15 pounds per square inch from an outside source, supplies acetylene at about 2 to 3 inches of water gauge pressure to the generator and maintains such pressure continuously therein during the recharging operation.

If it is desired to increase the pressure of the acetylene delivered to the generator while recharging the latter, the peripherally threaded spring compressive plug 166 may be rotated to move downwardly within the spring chamber 159, while if it is desired to decrease the pressure of acetylene supplied to the generator, plug 166 is rotated to move upwardly.

The intermediate housing I, shown in Figs. 1, 6, 7, 14 and 15, includes means for regulating the rate at which carbide is fed from the hopper H to the generating chamber G. As in Figs. 14 and 15, such means includes a pair of downwardly contracting funnel-shaped passages 180, formed integrally with the wall of the housing I, each of such passages terminating in a cylindrical discharge opening or aperture 181 provided with a suitable carbide sealing ring 182. A central canal or duct 183, disposed between each of the funnel-shaped passages 180, equalizes the acetylene pressure between the upper and lower portions of the intermediate housing. The discharge apertures 181 are closed by mushroom-type valves 184, which are pivotally mounted on the end of a relatively short leg of a U-shaped rocker arm 185. The longer leg of the U-shaped rocker arm 185 is pivotally connected at its upper end by a pin 199, as in Figs. 11 and 12, to a link or stud shaft 186, as in Figs. 12 and 13. Rocker arm 185 is also pivoted near its bend on a shaft 187 which is journaled in a supporting yoke 188 formed integrally with an inner diaphragm sealing ring 189. This ring is disposed against and suitably secures the periphery of diaphragm 192 across the end of an outwardly extending spring chamber 193, as in Fig. 13. A dog or detent 190 is formed at the bottom of each rocker arm 185 and engages a recessed cam 191 secured to shaft 96 in such a manner that upon rotation of shaft 96, rocker arm 185 is raised or lowered, as the case may be, and causes the valve 184 to engage or disengage the carbide sealing ring plate 182. When the recessed portion of cam 191 engages the detent 190, valves 184 are at an intermediate stop position and carbide is fed into the generating chamber G at a relatively slow rate. After the pressure in the generating chamber has increased sufficiently to cause the carbide feed valves 184 to close by the action of diaphragm 192, cam 191 may then be rotated counter-clockwise to permit the feed valves 184 to assume their fully opened position. The intermediate stop is a desirable feature, because if the carbide feed valves 184 are fully opened while pressure is being built up in the generating chamber there is a tendency to supply an excess amount of carbide over that required to bring the generating chamber to its normal operating pressure. In the event there is no demand for acetylene, this excess pressure is vented to the atmosphere through the pressure relief valve 73, thereby causing a loss of acetylene.

As explained previously in connection with Figs. 1, 3, 4, and 7, the outer end of shaft 96 is associated with interference mechanism M, so that movement of the shaft 96 is permitted only when the generator is in normally operative condition. Thus, through the cooperation of the interference mechanism previously described, the carbide feed valves 184 must be closed before the hopper door D can be opened.

The carbide feed valves 184 are normally operated in response to acetylene pressure fluctuations within the generating chamber. Such pressure fluctuations act against the above-mentioned diaphragms 192 which latter are suitably spring loaded and are of the type generally shown in Patent No. 2,188,277 to M. P. De Motte et al. A short flanged extension 194 of the intermediate housing I, best seen in Fig. 14, receives a cooperating flange 194' on the spring chamber 193. With reference to Fig. 13, the diaphragm 192 is provided with a pair of centrally disposed washers 195 and 195', one on either side thereof. A shaft 196, threaded on its outer end and provided with a slot 197 at its inner end, passes through the diaphragm 192 and washers 195 and 195'. One end of stud shaft 186 extends into slot 197 and is pivoted on a pin 198, while the other end of the shaft 186 is pivotally secured by a pin 199 to the end of the longer leg of the U-shaped rocker arm 185. A relatively high pressure spring 200 surrounds shaft 196 and stud shaft 186, and bears between the inner washer 195' and a spring receiver 201 provided adjacent the pin 199 at the end of the relatively longer leg of the U-shaped rocker arm. A nut 202 on the threaded end of shaft 196 clamps diaphragm 192 and the washers 195 and 195' to form a gas-tight assembly.

As in Figs. 13 and 14, diaphragm 192 is spring loaded on its external side by a spring 203, which abuts at one end against washer 195 and at the other end against an adjustable plate 204 mounted on a threaded spring-tension adjusting spindle 205, which is rotatably mounted in boss 206 provided in the outer end of spring chamber 193. A screw cap 207 may be provided to permit access to the end of spindle 205 for adjustment of the tension of spring 203. A stationary rod 205' passes through an aperture in plate 204 and prevents the latter from rotating when threaded shaft 205 is turned.

During normal operation of the generator, the springs 203 of both pressure-responsive feed devices F are equally adjusted so that carbide is fed in substantially equal amounts by both valves 184. When the acetylene pressure within the generator falls below a preselected value, springs 203 urge the diaphragms 192 inwardly, thus moving high pressure springs 200 and the longer legs of rocker arms 185 inwardly, thereby depressing rocker arms 185 and valves 184 and freeing the feed apertures 181 to permit carbide to flow into the generating chamber G. When the pressure of acetylene within the generating chamber slightly exceeds the desired pressure, the diaphragm 192 moves outwardly against the action of spring 203. This outward movement of the diaphragms causes the rotation of rocker arms 185 about shafts 187, bringing valves 184 into engagement with sealing surfaces 182 and thus stopping the feeding of carbide into the generating chamber.

As indicated previously, the presence of entrained moisture in the acetylene contacting the feed apertures 181 causes a certain amount of slaking of the incoming carbide with the formation of lime deposits, which may cake and fill up the apertures, thereby preventing feeding of carbide during normal operation. To remedy this condition, a rotary clean-out knife 210 is provided in each aperture 181, as in Fig. 15. Each knife 210 is provided with a plurality of blades 211 which generally conform to the shape of apertures 181 and to the top of valve 184 when in full engagement therewith. The clean-out knives are each fixedly mounted on one end of a rotatable splined shaft or spindle 212, while the other end of the latter is secured to a worm gear 213 which is adapted to engage the inner threaded portion of a vertical and internally threaded member 214. A spiral gear 215, slidable on splined shaft 212 and journaled between the lower end of hollow member 214 and a boss 216 disposed on a supporting plate 217, engages a cooperating spiral gear 218 mounted on a shaft 219. Shaft 219 drives similar clean-out knives in both feed apertures, and extends to the exterior of intermediate housing I through a suitable stuffing box 220. A handle 221 is provided at the external end of shaft 219, and when the latter is rotated, the spindles 212 rotate and move downwardly to cause the cutting blades 211 to descend simultaneously and to rotate into the feeding apertures 181 thus scraping and removing any caked lime or carbide formed thereon. After the blades 211 have reached the end of their travel, handle 221 is rotated in the opposite direction, thus causing the blades to be displaced upwardly from each respective orifice 181. The supporting plate 217 is suitably secured within the intermediate housing at a point slightly above the funnel-shaped passages 180, and is arranged to permit carbide to pass between the edge of said plate and the inner wall of the intermediate housing I. The plate 217 is also provided with a cover 222 to prevent carbide from interfering with the operation of the cutting mechanism. A threaded plug 223, as in Fig. 15, is tapped into the upper portion of the intermediate housing and permits access to clean out any carbide which may have caked on the cover 222.

The generated acetylene, as pointed out above, passes from the generating chamber G through conduit 71 to pressure regulator P disposed in the wall of the intermediate housing I. This acetylene pressure regulator is preferably a conventional regulator of the type generally described in U. S. Patent No. 2,106,971 to M. P. De Motte. Briefly, pressure regulator P, as in Fig. 16, comprises a valve 224; a spring loaded diaphragm 225, which may be regulated by handwheel 226 to deliver acetylene at a preselected pressure to exit conduit 227, which is connected to a valve 228 of Fig. 1; and a removable filter 229, which is disposed on the inlet side of valve 224 and which may be replaced by removing cover plate 230 at the rear of the valve housing 231. The side of the regulator P adjacent the intermediate housing I is provided with a removable slide 232, disposed in suitable peripheral guides 233. A conventional check valve 234, suitably mounted in the slide, permits acetylene to pass only during a recharging operation from the regulator to the central compartment of the intermediate housing and thence through the central passage 183 in the intermediate housing into the hopper H.

During normal operation of the generator, as shown generally in Fig. 1, and with the generating chamber G filled with water to the proper level and with the carbide hopper filled with carbide, the water inlet and overflow valves 25 and 26, and also sludge valve V, are closed. Acetylene return valves 76 and 77 are open, the latter being closed only when it is desired to isolate the generator, for repair or disassembly, from the distribution system. The interference mechanism M locks the carbide hopper door D in closed position, and interference disc 98 is disengaged from the carbide feed valve lock-up shaft 96, thus permitting carbide to be fed to the generator in response to acetylene pressure fluctuations. As the generation of acetylene proceeds the level of the carbide within the hopper H may be determined by lifting weighted rod 70 and noting the position of the crank 68 with reference to the scale 69. Through acetylene supply valve 228, acetylene passes at about one atmosphere gauge pressure to the distributing system.

When the carbide in the hopper H is exhausted, or nearly so, and it is desired to recharge the generator, the acetylene supply valve 228 is closed, and disc 98 is turned to lock the carbide feed valves 184 in closed position. The sludge valve V is then opened, and the sludge within the chamber G discharged therefrom. As the sludge discharges, the pressure of the residual acetylene within the generating chamber diminishes, and when such pressure has reached a positive value of not less than several inches of water, e. g. about 3 or 4 inches of water gauge pressure, acetylene pressure regulator Va opens and permits acetylene to flow at this low pressure through conduit 75, valve 76, cross 72 and conduit 71 into the generating chamber G. By continuously maintaining a slight super-atmospheric pressure within the generator, the possibility of air leaking into the latter is avoided. After the sludge has been completely discharged, the sludge valve V is closed and the generator is filled to the proper level with water. This is accomplished by moving the handle 35 of the water overflow valve 26 downwardly through an arc of 90°, and thereafter rotating the stem 27 of the inlet water valve 25 clockwise through an arc of 90°. Water then sprays into the generating chamber G through spray nozzles 22. Acetylene within the generator is absorbed or dissolved by the entering water, and as the level of the water rises the acetylene is compressed. Due to the efficient and rapid absorption of the acetylene in the water spray, the pressure within the generator when filled with water to the proper level is not substantially greater than normal generator pressure, and little if any acetylene is vented to the atmosphere through pressure relief valve 73 and vent 40 in the overflow trap 37. Due to the interfering action of cams 28 and 31, the water inlet valve 25 must be closed before the water overflow valve 26 can be closed.

The next step in the recharging operation is to fill the carbide hopper H, and this is accomplished by closing acetylene return valve 76 by rotating the handle 80 thereof upwardly through an angle of 90°, from the position shown in Fig. 1. Such movement causes the interference mechanism M to lock the shaft 96 of the carbide feed valve lock-up device Lf in closed position, open the pressure relief valve 73 momentarily, and disengage the rod 90 from the hopper charging door D. Hand wheel 61 is then rotated to release the cover plate 56 from the flange 50, and door D is swung outwardly. A small amount of acetylene flows from the conduit 75, through conduit 78, cross connection 72, conduit 75', pressure regulator P, check valve 232, and central passage 183 into the hopper H to prevent air from entering the hopper while door D is open and thus to avoid entrapment of air in the hopper after the door D has been closed. After the hopper H of the generator has been filled with carbide to the proper level, door D is closed and handle 80 of the acetylene return valve 76 rotated counter-clockwise through an angle of 90°, whereupon handle 80 again assumes the position shown in Fig. 1. This movement causes the interference mechanism M to lock the door D in closed position, release the lug 97 from the carbide valve lock-up disc 98, and again open momentarily pressure relief valve 73. By rotating handle 99 of the carbide valve lock-up device to the intermediate open position, carbide may be slowly fed from hopper H to the generating chamber G and the pressure of acetylene within the latter gradually built-up. When the acetylene pressure reaches the normal generator pressure the handle 99 is rotated to its fully opened position thereby permitting carbide to be fed in response to pressure fluctuations. The generator is now ready for service and valve 228 is opened. Carbide is fed to the central portion of the generating chamber and comes in contact with water within the area bounded by the circular baffle plate 20. Most of the evolved acetylene is collected under the dome 15 within the baffle plate 20. The acetylene thus collected passes downwardly and under the serrated edge 21 of the baffle plate 20 and it is thereby scrubbed of entrained carbide or lime dust. The scrubbed acetylene collects under dome 15, passes through conduit 71, cross connection 72, pressure regulator P and is delivered to the distributing system at valve 233.

The operation of the generator provided with the interference mechanism shown in Figs. 6 and 7 is substantially identical with the operation of the generator shown in Fig. 1, and such interference mechanism operates in the manner previously described.

While certain embodiments of the invention have been specifically illustrated and described, it will be obvious to those skilled in the art that the invention may be otherwise embodied and practiced without departing from the principles or scope of the invention.

We claim:

1. In a method of recharging an acetylene generator of the carbide-to-water type, the steps of discharging sludge, resulting from the reaction between carbide and water, from the generating chamber of said generator; supplying additional acetylene as needed to maintain continuously in said chamber a superatmospheric pressure; spraying water into said chamber to saturate substantially said water with acetylene and to compress undissolved acetylene to a pressure not substantially greater than the operating pressure of said generator when said chamber has been filled to its proper level; and terminating such spraying prior to the introduction of carbide into said water.

2. In a method of recharging a carbide-to-water type acetylene generator, the steps of discharging sludge, resulting from the reaction of carbide with water, from the generating chamber of said generator; continuously maintaining acetylene at a gauge pressure of not less than several inches of water within said chamber while said sludge is being discharged therefrom; thereafter filling said chamber to the proper level with water by spraying said water into said chamber, whereby such spraying causes the acetylene within said chamber to be substantially dissolved in said water to minimize the loss of acetylene by the filling and compressive action of said water within said chamber; terminating such spraying; and generating acetylene by bringing carbide into contact with such water in said chamber.

3. Method of recharging an acetylene generator of the type in which acetylene is generated by the reaction between calcium carbide and water leaving a residue in the form of a sludge, such method including the steps of positively discharging sludge from said generator; adding acetylene at superatmospheric pressure to said generator; spraying water into said generator to mix intimately with and to absorb said acetylene; and adding more acetylene under superatmospheric pressure to replace that absorbed by said water and to maintain the pressure in said generator within predetermined limits.

4. In a method of recharging an acetylene generator in which acetylene is generated at a medium pressure of about 10 to 15 pounds per square inch gauge, by the reaction between carbide and water, leaving a residue in the form of a sludge, such method comprising the steps of discharging said sludge from the generating chamber of said generator by employing the pressure of residual acetylene within said chamber to force the sludge therefrom; supplying additional acetylene to said chamber to maintain continuously therein a superatmospheric pressure; spraying water into said chamber at a pressure greater than said medium pressure after said sludge has been discharged therefrom to refill said chamber to a predetermined level with water substantially saturated with acetylene and to compress undissolved acetylene to a pressure not greater than said medium pressure; terminating such spraying; and thereafter generating acetylene by bringing said carbide into contact with the water in said generating chamber.

5. An acetylene generator comprising, in combination, a lower generating chamber; an upper carbide hopper having a charging door and disposed in spaced relation to said chamber; a removable intermediate section disposed between said lower generating chamber and said upper carbide hopper, said intermediate section having control means including pressure-relief valve means and carbide-feeding means which latter is adapted to be locked in closed position; and interference means interconnecting said charging door, said pressure relief valve means, and said carbide-feeding means, said interference means being constructed and arranged to permit the opening of said charging door only when the carbide-feeding means is locked in closed position and after excess pressure within said generator has been released through said relief valve by the movement of said interference means.

6. An acetylene generator comprising, in combination, a lower generating chamber; an upper carbide hopper disposed in spaced relation to said chamber and having a charging door and means for indicating the level of carbide therein; a removable intermediate section having one end abutting the lower edge of said hopper and the other end abutting the upper edge of said generating chamber, said intermediate section having therein means for feeding carbide from said hopper to said chamber, said feeding means being adapted to be locked in closed position; and interference mechanism interconnecting said charging door, said indicating means and said feeding means, said indicating means being connected to said interference mechanism by lost motion linkage in such manner that upon locking of said feeding means in closed position and upon displacement of said interference mechanism said charging door is unlocked and said indicating means is raised to an inoperative position, and upon the return of said interference mechanism to its original position said charging door is locked and said indicating means is permitted to contact the surface of the carbide within said hopper and to act independently of said interference means.

7. An acetylene generator comprising, in combination, an acetylene generating chamber for containing water; a carbide hopper disposed above and in spaced relation to said chamber; an intermediate housing arranged in abutting relation to and between said chamber and said hopper, said housing including a funnel-shaped plate having dual carbide feed openings for feeding carbide from said hopper to said chamber; a carbide-cutting assembly including a pair of blades, said blades being adapted to ream out said openings and each of said blades being secured to one end of a shaft which is splined to a rotatable spiral gear; threaded means disposed at the opposite end of said shaft and adapted to engage a fixed threaded means; and an auxiliary spiral gear for driving said rotatable spiral gear.

8. An acetylene generator as claimed in claim 7, in which each auxiliary spiral gear is secured to a common drive shaft; whereby the rotation of said drive shaft in one direction causes the simultaneous rotation and downward displacement of each cutting assembly within its respective opening; and rotation of said shaft in the opposite direction causes reverse rotation and upward displacement of each cutting assembly from its respective opening.

9. An acetylene generator comprising, in combination, an upper carbide hopper; a lower acetylene generating chamber; carbide-feeding valve means between said hopper and said chamber; a rotatable shaft adapted to secure said valve means in closed position; and means for locking said rotatable shaft when said valve means is in closed position, said locking means including a plate having circular and recessed edge portions, axially secured to said shaft, and a rod slidably interfitting with said recessed portion to lock said valve in closed position and to slide over said circular portion when said valve is in an operating position.

10. An acetylene generator comprising, in combination, an acetylene generating chamber; a carbide hopper having a charging door, said hopper being disposed in spaced relation to said chamber; an intermediate section disposed between and in gas-tight relation to said hopper and said chamber; said intermediate section housing an acetylene pressure-regulating valve, means for feeding carbide from said hopper to said generating chamber, and means for locking said carbide feeding means in closed position; conduit means extending from the upper portion of said generating chamber to the inlet of said pressure-regulating valve, said conduit means including a pressure-relief valve; auxiliary conduit means connected to said first-mentioned conduit means for supplying acetylene thereto while said generator is being recharged, said auxiliary conduit means including a stop valve; interference means interconnecting said stop valve with said hopper charging door, said carbide-feed locking means, and said pressure-relief valve; said interference means being so constructed and arranged that the movement of said stop valve from open to closed position causes said interference means to unlock said hopper charging door, to lock said carbide feeding means in closed position, and to open and close said pressure-relief valve.

11. In an acetylene generator comprising, in combination a pressure-relief valve, a carbide hopper having a door and a lock for said door, means for interconnecting said valve and said lock; means for opening said pressure-relief valve; and lever means provided with a lost-motion connection engaging said valve opening means, whereby partial movement of said lever means in one direction effects the opening of said valve and continued movement of said lever in said direction disengages said valve opening means to permit said valve to close automatically, and to permit said interconnecting means to operate said lock.

12. In an acetylene generator having a generating chamber containing a body of water for reacting with carbide supplied through an opening in the upper portion of said chamber, the combination of a baffle disposed around and in gas tight connection with said opening and having a lower edge extending downwardly to a point beneath the normal operating level of said body of water; spray nozzle means disposed within said chamber but externally of said baffle; a valve for controlling the supply of water to said spray nozzle means; a water-overflow having an inlet orifice disposed at said normal operating level to limit the volume of water within said chamber; and a valve disposed in said water-overflow, said last-mentioned valve being constructed and arranged to operate sequentially with said first-mentioned valve.

13. An acetylene generator as claimed in claim 12, in which sequential operation of each of said valves is obtained by providing each valve with an arcuate cam, both of said cams being constructed and arranged to interlock with each other to insure the opening of the water-overflow valve prior to the opening of the water-inlet valve and the closing of the water-inlet valve prior to the closing of the water-overflow valve.

14. A medium pressure acetylene generator of the carbide-to-water type comprising, in combination, a carbide hopper; a generating chamber adapted to contain a relatively large quantity of water; said generating chamber being provided with water inlet and spraying means, and water outlet means having an inlet orifice disposed at a point above said spraying means; valve means disposed externally of said generator in each of said water inlet and outlet means; said valve means being closely adjacent each other and provided with rotatable cooperating interference members having adjacent convex and concave peripheral edge portions of substantially similar curvature, said members being so constructed and arranged that the concave portion of one of said members will rotate past only the convex portion of the other of said members, and thereby cause said valve means to be sequentially operated.

15. In an acetylene generator having a generating chamber containing a body of water adapted to receive carbide from an opening in the upper portion of said chamber, the provision of baffle means disposed around and in gas-tight connection with said opening and extending downwardly to a point beneath the surface of said water, and a plurality of spray nozzles positioned so as to impart a rotary mixing action of acetylene and water spray around said baffle means and within the gas space of said generating chamber.

CLARENCE H. BAKER.
MALVEN L. OLSON.